United States Patent
Steiner

(10) Patent No.: US 9,428,361 B2
(45) Date of Patent: Aug. 30, 2016

(54) DEVICE FOR CONVEYING FLAT ELEMENTS

(71) Applicant: BOBST MEX SA, Mex (CH)

(72) Inventor: Christophe Steiner, Crissier (CH)

(73) Assignee: BOBST MEX SA (CH)

( * ) Notice: Subject to any disclaimer, the term of this patent is extended or adjusted under 35 U.S.C. 154(b) by 0 days.

(21) Appl. No.: 14/773,430

(22) PCT Filed: Mar. 5, 2014

(86) PCT No.: PCT/EP2014/000562
§ 371 (c)(1),
(2) Date: Sep. 8, 2015

(87) PCT Pub. No.: WO2014/135278
PCT Pub. Date: Sep. 12, 2014

(65) Prior Publication Data
US 2016/0016749 A1    Jan. 21, 2016

(30) Foreign Application Priority Data
Mar. 8, 2013 (EP) ..................... 13001175

(51) Int. Cl.
B65G 15/26    (2006.01)
B65H 29/16    (2006.01)
B65G 21/14    (2006.01)
B65H 5/02     (2006.01)

(52) U.S. Cl.
CPC ............. *B65H 29/16* (2013.01); *B65G 21/14* (2013.01); *B65H 5/021* (2013.01); *B65H 2404/254* (2013.01); *B65H 2701/1766* (2013.01)

(58) Field of Classification Search
CPC ...... B65G 21/14; B65G 13/12; B65G 23/44; B65G 15/26
USPC ............... 198/588, 594, 595, 782, 812, 813; 193/35 SS
See application file for complete search history.

(56) References Cited

U.S. PATENT DOCUMENTS 2,826,290 A     3/1958  Barski
5,040,655 A *   8/1991  Lacagnina .......... B29D 30/3007
                                          193/35 SS
6,935,487 B2 *  8/2005  Schaum ................ B65G 21/14
                                          198/588

FOREIGN PATENT DOCUMENTS

DE    19 15 647 A1    10/1970
EP    0 638 502 A2     2/1995
EP    2 406 159 A1     1/2012
JP    H07-38024        7/1995

OTHER PUBLICATIONS

International Search Report dated May 28, 2014 issued in corresponding International patent application No. PCT/EP2014/000562.

* cited by examiner

Primary Examiner — James R Bidwell
(74) Attorney, Agent, or Firm — Ostrolenk Faber LLP

(57) ABSTRACT

A device (1) for transporting planar elements along a given conveying path, which includes an endless transport member (10) that is movably guided over the entire length of the conveying path by a series of substantially adjacent guide members (20, 30), at least one movable guide member (30) being movably mounted separately from the static guide members (20) that are fixedly mounted, between a retracted position in which the movable guide member (30) is placed in direct alignment with the static guide members (20), and a deployed position in which the movable guide member (30) is spaced apart from the static guide members (20). Complementary guide members (40) are movably mounted to move between a reserve position, in which complementary guide members are spaced apart from the static guide members (20) and from the movable guide member (30) when the latter is in the retracted position, and a service position, in which the complementary guide members are continuously inserted between the static guide members (20) and the movable guide member (30) when the latter is in the deployed position.

10 Claims, 4 Drawing Sheets

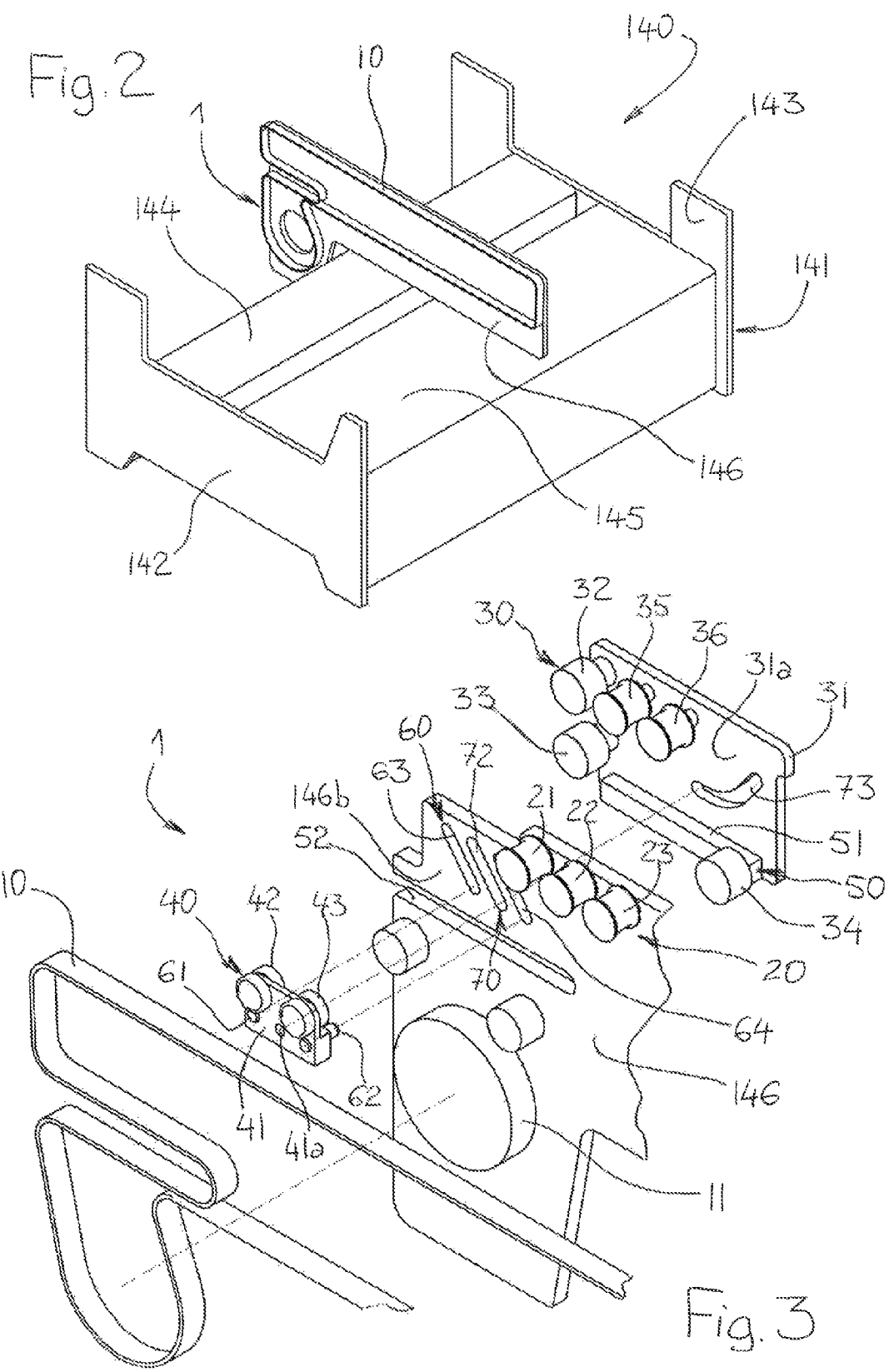

DEVICE FOR CONVEYING FLAT ELEMENTS

CROSS-REFERENCE TO RELATED APPLICATIONS

The present application is a 35 U.S.C. §§371 National Phase conversion of PCT/EP2014/000562, filed Mar. 5, 2014, which claims priority of European Patent Application No. 13001175.2, filed Mar. 8, 2013, the contents of which are incorporated by reference herein. The PCT International Application was published in the French language.

BACKGROUND OF THE INVENTION

The present invention relates to a device permitting the conveying of flat elements, in particular through a module of a processing machine. The invention applies particularly advantageously, but not exclusively, to the field of manufacturing cardboard packaging boxes.

In the packaging industry, the manufacture of foldable boxes is traditionally carried out on a production line, by folding and gluing blanks by means of a folding-gluing machine. Such a processing machine is generally in the form of a succession of modules in which various functional arrangements are distributed, and is designed to carry out the many basic operations required for making the boxes. Each module has its own system for conveying the blanks, but the assembly is arranged so that ultimately, the conveying is carried out continuously over the entire length of the folding-gluing machine.

Among conveying systems known from the prior art, conveyor belts have proved to be particularly well suited to folding-gluing machines. This type of conveying device in broad outline comprises an endless belt which is able to be driven to travel about a plurality of guide members. The guide members essentially include deflecting elements which define the path followed by the belt, as well as bearing elements which serve as a support for the belt in the area where the conveying actually takes place, i.e. along the conveying path of the blanks.

PRIOR ART

In practice, when a belt conveyor is positioned longitudinally in a folding-gluing module, it is generally movably mounted so as to be laterally displaceable in order to be able to adjust its transverse position as a function of the size and/or the shape of the blanks to be conveyed. Moreover, and although in principle it may be used alone as a simple lower conveyor, it is usually used in combination with an upper conveyor belt or an upper ramp provided with pressure rollers.

This type of conveying device, however, has the drawback of having to be entirely incorporated within the module. More specifically, it would be inconceivable to make it protrude from the module without the risk of its transverse mobility being restricted, or even prevented, by the presence of an obstruction in its immediate external environment such as, in particular, a conveyor belt of an immediately adjacent module.

Thus if full integration makes it possible to guarantee the free transverse displacement of the conveyors of two successive modules, it also requires a relative positioning of the modules in somewhat close proximity to one another in the longitudinal direction, even in the case where the conveyors are placed in the extension of one another in succession. This means that when a blank is to be transferred from one module to another, inevitably it will pass through an empty space in which no support or guidance is provided. Inevitably, therefore, this results in slippage which naturally tends to alter the position of the blanks which ultimately may significantly impair the process of manufacturing the boxes.

SUMMARY OF THE INVENTION

In addition, the technical problem to be remedied by the subject of the present invention is to propose a conveying device for flat elements along a given conveying path, comprising an endless conveying member which is guided so as to travel over the entire length of the conveying path by a succession of substantially adjacent guide members. The conveying device makes it possible to avoid the problems of the prior art by improving the transfer of each flat element when the flat element arrives at its upstream end and/or when it leaves its downstream end of the conveying device.

One portion of guide members, comprising at least one mobile guide member, is movably mounted at a distance from another portion of guide members, called static guide members, which are fixedly mounted, said mobility taking place between a retracted position in which the mobile guide member or members are placed in direct continuity with the static guide members and a deployed position in which the mobile guide member or members are kept at a distance from the static guide members.

According to the present invention, the solution to the technical problem posed is that the conveying device further comprises complementary guide members which are movably mounted so as to be displaced between a reserve position in which they are placed at a distance from the static guide members and the mobile guide member or members when the mobile guide members are in the retracted position and a service position in which the complementary guide members are interposed continuously between the static guide members and the mobile guide member or members when the mobile guide members are in the deployed position.

The concept of a flat element refers to any flattened object of low thickness, irrespective of its shape, its size or the material of which it is composed, such as a complete sheet, a pre-cut sheet, a set of templates or blanks attached at regular intervals to one another, an individual template or blank, a folding box, etc. Moreover, such a flat element may be produced from any material and in particular from paper, compact cardboard, corrugated cardboard, plastics material, etc.

The concept of an endless conveying member relates to any element which is loop-shaped and which has sufficient structural flexibility to permit it to travel continuously along a non-linear closed path. Such a conveying member usually denotes a thin belt, a more or less narrow strip or a belt of any width.

The type and dimensions of the conveying member determine the type and size of the different guide members which are present along the conveying path of the flat elements. However, the primary function of each guide member is also dictated by whether the guide member plays a deflection role, guiding the conveying member at one of the two ends of the conveying path, or a support role serving as a bearing surface for the conveying member between the ends of the conveying path. These different guide members preferably consist of rotating elements such as guide rollers or rollers, while static elements such as slide rails and other fixed supports are also conceivable.

The invention as defined above permits the conveying device to have a structure of variable geometry, wherein the length of the conveying path varies. It is thus possible to modify the range of the conveying device, both at its downstream end and at its upstream end, which ultimately permits the longitudinal space requirement of the device to be adapted.

Such a capacity for adaptation may be advantageously used to adopt an adjusted configuration in which the conveying device is made more compact longitudinally, in order to guarantee its freedom in transverse displacement. However, this capacity for adaptation may also be used to place the conveying device in an optimal operating configuration in which it is deployed longitudinally in order to promote the continuity of the conveying function at its ends.

The invention may apply both to a lower conveying device or an upper conveying device. It may be used equally in the region of the upstream part and in the region of the downstream part of the conveying device under consideration.

A conveying device according to the invention may be provided on any machine in which flat elements are conveyed. If such a machine also has a modular structure, as is the case in particular of a folding-gluing machine, the device may be positioned in principle in any module.

BRIEF DESCRIPTION OF THE DRAWINGS

The present invention further relates to the features which are disclosed from the following description and which have to be considered individually or according to any of the possible technical combinations thereof. This description, provided by way of non-limiting example, is designed to enable clearer understanding of the invention and how it may be implemented. The description is also provided with reference to the accompanying drawings, in which:

FIG. 2 shows the lower part of the internal structure of the embossing module, on which one of the conveying devices is mounted;

FIG. 3 shows the downstream portion of the conveying device in an exploded view;

DETAILED DESCRIPTION OF PREFERRED EMBODIMENTS

Figure 1:
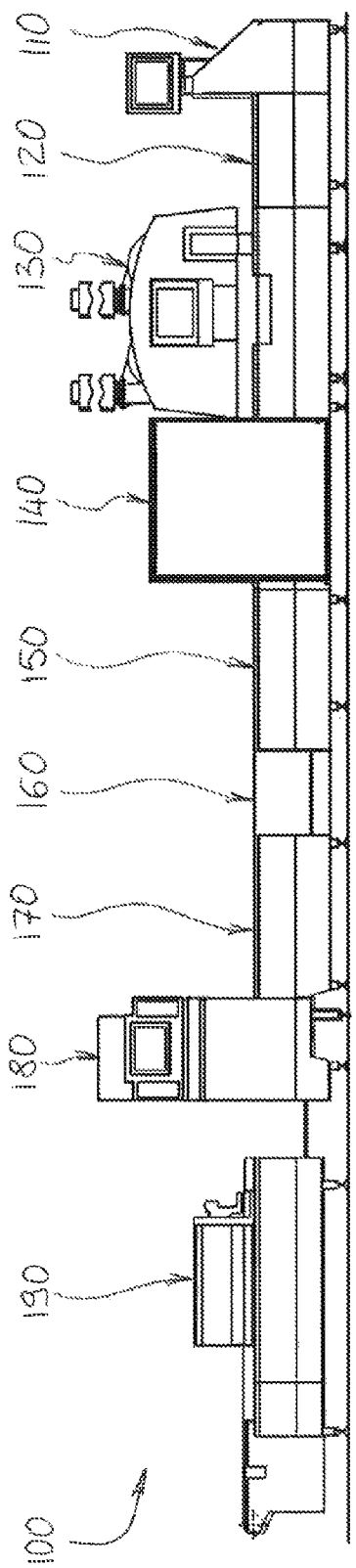
FIG. 1 illustrates a folding-gluing machine in which a module for embossing braille characters is integrated, said module being provided with conveying devices according to the invention.

FIG. 1 illustrates a folding-gluing machine 100, i.e. a processing machine which is designed to fold and glue a succession of flat elements in the form of blanks with the purpose of manufacturing folding boxes. Provided with a modular structure, this folding-gluing machine 100 is conventionally composed of a feeder 110, an alignment module 120, a quality control module 130, a module for embossing braille characters 140, a pre-scoring module 150, a gluing module 160, a folding module 170, a transfer module 180 and a receiving module 190. As these different elements are sufficiently well known from the prior art they are not described in detail here, whether structurally or functionally.

FIGS. 2 to 7 relate solely to the embossing module 140, and more particularly to the conveying system which is designed to convey horizontally the different blanks over the entire length of the module. This conveying system is noteworthy in that it uses several conveying devices 1 according to the invention. In practice, three lower conveyors are made up of a central element and two lateral elements, three upper conveyors also including a central element and two lateral elements being associated therewith. Logically, the assembly is arranged such that the three upper conveyors extend respectively above and opposite the three lower conveyors.

For obvious reasons of clarity, only one of the conveying devices 1 has been shown in FIG. 2. As it refers to a lower conveyor, it is solely the lower part of the internal structure of the embossing module 140 which appears on this drawing. Finally and still due to the same reasoning, the functional arrangement designed to carry out the embossing of the blanks is not visible either.

FIG. 2 shows, however, that the lower part of the internal structure of the module 140 includes a frame 141 which is essentially comprised of two vertical side walls 142, 143 which are spaced apart laterally in FIG. 2 and are connected by two horizontal crossmembers 144, 145. The conveying device 1 in turn is mounted on a longitudinal member 146 which is positioned and extends longitudinally in the module 140 in the direction of movement of the frame and which is movably mounted to be moved in lateral translation relative to the frame 141 so that its transverse position is adjustable. In practice, and although this is not visible in FIG. 2, the front and rear parts of the longitudinal member 146 may cooperate by sliding along two transverse guide rails which are respectively fixed to the front 144 and rear 145 crossmembers of the frame 141.

It is also observed in FIG. 2 that the conveying device 1 (shown in simple form in FIG. 2 and more specifically in FIGS. 3-7) is designed to convey each blank along a conveying path which extends over the entire length of the embossing module 140 (generally left to right in FIG. 2). The displacement itself takes place with the blank in the flat state, by horizontal translation along a trajectory which is linear and oriented in parallel with the axis of the folding-gluing machine 100.

FIGS. 2 to 7 show that the conveying device 1 includes an endless conveying member 10 of flexible structure which is capable of being driven to travel along the entire length of the conveying path of the blanks, in addition to passing over a succession of guide members 20+ and 30+ which are able to guide the travel of the conveying member 10 over the entire length of the conveying path.

Figure 7:
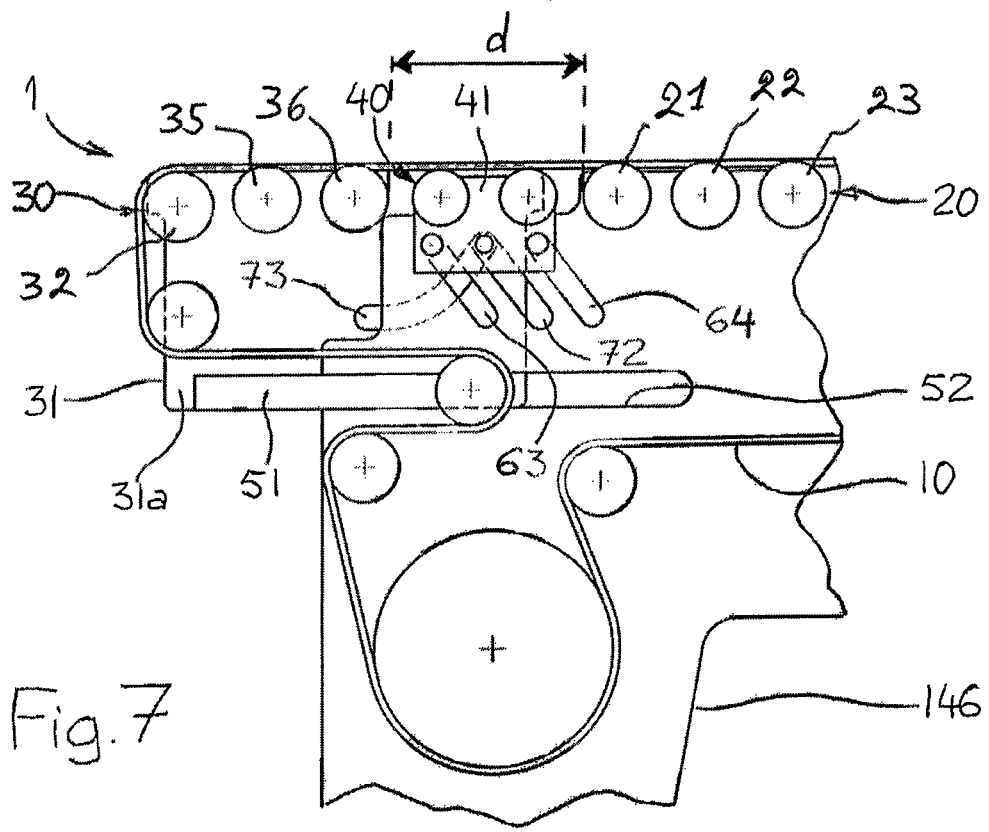
FIG. 7 is a side view showing the conveying device in the deployed position.

A first portion of the guide members, called the mobile guide members 30, are movably mounted at a distance from another second portion of the guide members, called the static guide members 20, which are fixedly mounted. The mobility of members 30 takes place between a retracted position in which the mobile guide members 30 are placed in direct continuity, here aligned with the static guide members 20 (FIG. 5) and a deployed position in which the mobile guide members 30 are kept at a distance from said static guide members 20 (FIG. 7). The conveying device 1 further comprises a third portion of complementary guide members 40+ which are movably mounted to be displaced between a reserve position in which they are placed at a distance from the static guide members 20 and the mobile guide members 30 when the mobile guide members are in the retracted position (FIG. 5) and a service position in which they are interposed continuously again aligned between the static guide members 20 and the mobile guide members 30 when the mobile guide members are in the deployed position (FIG. 7).

The displacement of the mobile guide members 30 in principle may take place according to any movement, such as a translatory or rotational movement, or a combination of both of these types of movement. Once the retracted position or the deployed position of the guide members has been reached, the mobile guide members 30 and the static guide members 20 are systematically located tangentially to the conveying path of the flat elements. The same applies to the displacement movement of the complementary guide members 40, which in turn may also be any movement. In the service position (FIG. 7), the complementary guide members 40 are also arranged tangentially to the conveying path of the flat elements but, in the reserve position (FIG. 5 or 6), they are retracted relative thereto.

In this embodiment, selected as an example, the conveying device 1 is of the belt conveyor type. More specifically, it uses a conveying member 10 which is in the form of a belt which is driven to travel on itself by means of a drive pulley 11 while the different guide members 20, 30 and 40 comprise rotating guide rollers 21, 22, 23, 32, 33, 34, 35, 36, 42 and 43 for example. Some of the guide rollers also play a deflection role such as the guide rollers 32, 33 and 34, for example, while others primarily provide a support function as is provided by the guide rollers 21, 22, 23, 35, 36, 42 and 43.

According to one example of the invention, between the retracted position (FIG. 5) and the deployed position (FIG. 7), the different mobile guide members 30 are fixedly mounted to be mobile in longitudinal translation along a trajectory which is substantially parallel to the conveying path of the flat elements. According to the profile of the conveying path used, the displacement trajectory of the mobile guide members 30 may be rectilinear, curved or result from a combination of these two types of movement.

The conveying device 1 is provided with first guide means 50 which are able to guide the displacement of the mobile guide members 30 between the retracted position and the deployed position.

Figure 4:
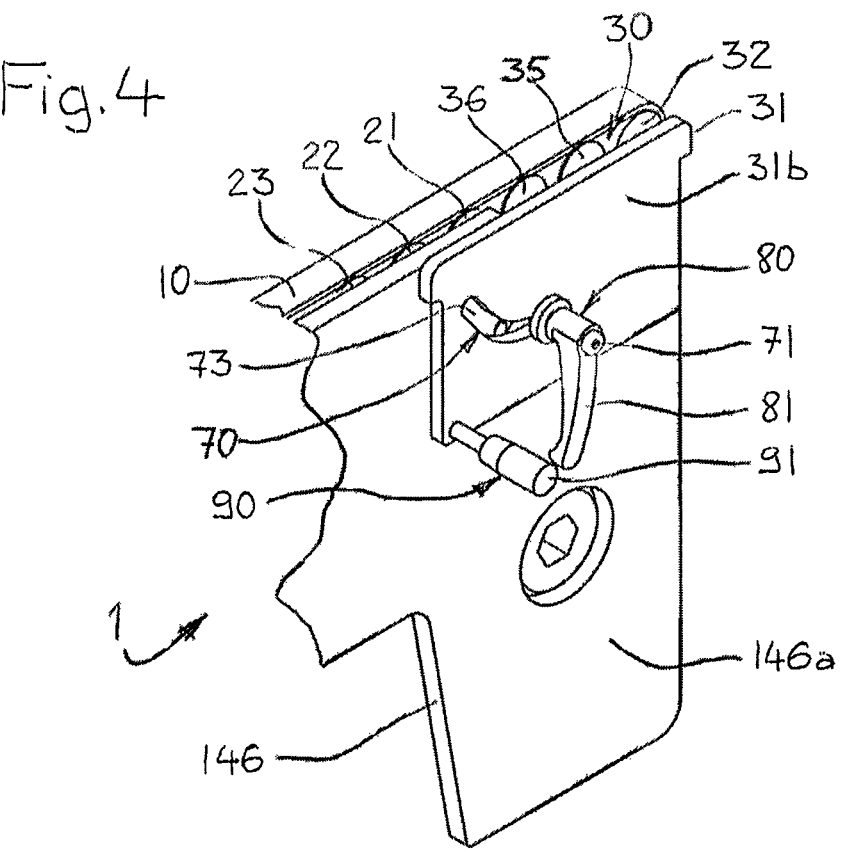
FIG. 4 also shows the downstream portion of the conveying device, but in an assembled state and according to a viewing angle substantially opposing that of FIG. 3.
Figure 5:
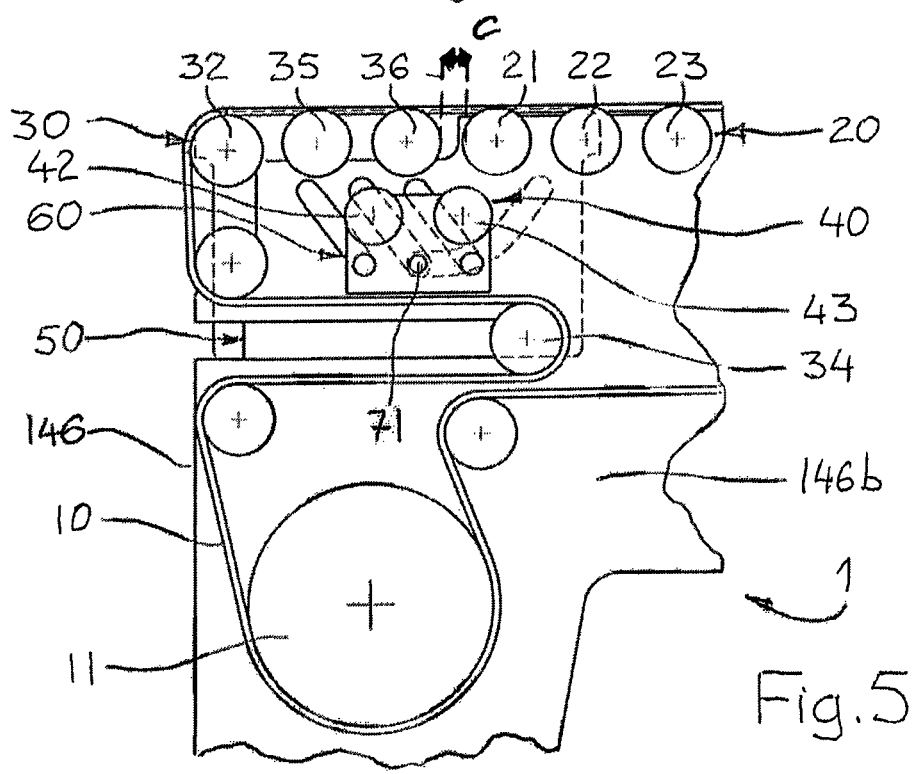
FIG. 5 is a side view illustrating the conveying device in the retracted position.
Figure 6:
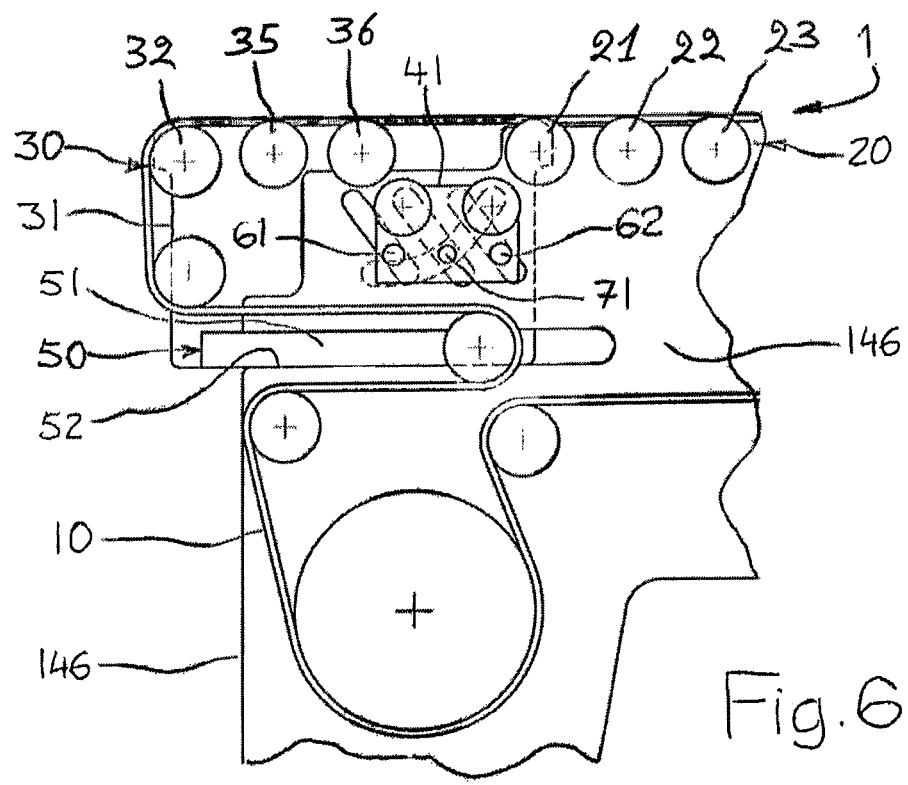
FIG. 6 constitutes a view similar to FIG. 5 but with the mobile part of the conveying device during displacement.

In this embodiment, the different mobile guide members 30 are thus fixedly mounted so as to be mobile in translation. The mobile guide members are fixed to a common support plate 31 which is able to slide against a lateral face 146a of the longitudinal member 146 (FIG. 4). The first guide means 50 comprises a rectilinear rib 51 which extends laterally along the internal face 31a of the support plate 31 and which cooperates by sliding with a rectilinear slot 52 formed horizontally at the front of the longitudinal member 146 (FIGS. 5 to 7). The support plate 31 may thus be translated longitudinally inside the embossing module 140 along a rectilinear and horizontal trajectory which is parallel to the conveying path of the blanks.

Between the reserve position (FIG. 5) and the service position (FIG. 7), the different complementary guide members 40 are fixedly mounted so as to be mobile in longitudinal translation along a trajectory which is substantially oblique relative to the conveying path of the flat elements. Here again, the trajectory of displacement of the complementary guide members 40 may be of any type, i.e. rectilinear, curved or a combination of these two types of movement.

The conveying device 1 is provided with second guide means 60 which guide displacement of the complementary guide members 40 between the reserve position and the service position.

The complementary guide members 40 are fixed for their displacement. To achieve this, they are mounted on a support carriage 41 which slides against the lateral face 146b of the longitudinal member 146. The face 146b is opposed to the face 146a, described above. The second guide means 60 in turn comprise two fingers 61, 62 which extend laterally from the internal face of the support carriage 41 and which cooperate by sliding respectively within two rectilinear slots 63, 64 formed through the longitudinal member 146, just above the slot 52 (FIGS. 4 to 7). The slots 63, 64 also extend obliquely relative to the conveying path. The translation of the support carriage 41 logically occurs along a trajectory which is both rectilinear and oblique. Simultaneous use of two fingers 61, 62 carries out dual guidance in order to guarantee the stability of the support carriage 41 during its displacement and to thus avoid any risk of the carriage tilting.

The conveying device 1 comprises coupling means 70 which cause displacement of the complementary guide members 40 between the reserve position and the service position, when the mobile guide members 30 are displaced between the retracted position and the deployed position.

The coupling means 70 comprise a drive element 71 which is fixed to complementary guide members 40 and which cooperate simultaneously by sliding, on the one hand, with a guide element fixed to the static guide members 20, called the static drive guide 72, and, on the other hand, a guide element fixed to the mobile guide members 30, called the mobile drive guide 73. The static drive guide 72 is formed to define an oblique guide trajectory which extends in a vertical longitudinal plane and which moves toward the conveying path relative to the direction of displacement of the flat elements. The mobile drive guide 73 is in turn shaped so as to define an oblique guide trajectory which extends in a vertical longitudinal plane and which moves away from the conveying path relative to the direction of displacement of the flat elements.

FIG. 5 shows more particularly that in the retracted position the drive element 71 is located at the respective ends of the drive guides 72, 73 which are the furthest away from the conveying path, while FIG. 7 shows that in the deployed position, it is positioned in the region of the ends which are the closest thereto. According to FIGS. 5 to 7, the assembly is arranged such that any displacement of the mobile guide members 30 relative to the static guide members 20 forces the drive element 71 to slide simultaneously along the two drive guides 72 and 73. As said drive guides are arranged obliquely relative to the conveying path and in directions which substantially intersect, the dual sliding of the drive element 71 causes the displacement of the complementary guide members 40.

It is understood here that the type, shape, dimensions and arrangement of the drive guides 72 and 73 depends directly on those of the drive element 71 which is associated therewith, and vice-versa. However, in practice, each drive guide 72 and 73 is usually in the form of a slot, a groove or a rib while the drive element 71 simply adopts any shape which is compatible in terms of guidance with each of the drive guides 72 and 73.

In this embodiment, the static drive guide 72 consists of a slot which is formed through the longitudinal member 146 and which extends obliquely relative to the conveying path in a direction which moves toward the conveying path relative to the direction of displacement of the flat elements. The mobile drive guide 73 in turn is in the form of a slot which is formed through the support plate 31 and which extends obliquely relative to the conveying path, along a trajectory which moves away from said conveying path relative to the direction of displacement of the flat elements. Finally, the drive element 71 consists of a rod which is fixed to the support carriage 41 in the region of a hole 41a and which extends transversely by successively passing through the static drive guide 72 and the mobile drive guide 73.

In a particularly advantageous manner, one of the drive guides 72 defines a rectilinear guide trajectory, while the other drive guide 73 defines a curved guide trajectory. The importance of such a configuration is to make the displacement of the complementary guide members 40 non-linear in terms of time relative to the displacement of the mobile guide members 30.

In this embodiment, the static drive guide 72 consists of a rectilinear slot, while the mobile drive guide 73 is in the form of a curved slot. If the passage from the retracted position to the deployed position (FIGS. 5 to 7) is considered, this configuration permits the displacement of the mobile guide members 30 to be promoted in a first step. In a second step, it permits the complementary guide members 40 to bypass the mobile guide members 30 easily in spite of their respective space requirement. Finally, in a third step, this promotes the displacement of the complementary guide members 40 in a direction substantially at right angles to the conveying path, which ultimately facilitates their insertion between the mobile guide members 30 and the static guide members 20. Naturally, the passage from the deployed position into the retracted position is carried out according to reverse kinematics.

According to a further feature of the invention, the conveying device 1 is also provided with locking means 80 which are able to block the mobility of the mobile guide members 30 between the retracted position and the deployed position.

In this exemplary embodiment, the locking means 80 in practice consist of a handle 81, a thread being formed therein which is capable of cooperating with the threaded end of the rod 71 by being screwed thereto. The blocking of the mobile guide members 30 is thus carried out by simply pulling the locking handle 81 tightly against the support plate 31 (FIG. 4).

According to a further advantageous feature, the conveying device 1 is further provided with handling means 90 which are fixed to the mobile guide members 30 and which are able to be activated manually so as to cause the displacement of the mobile guide members 30 between the retracted position and the deployed position.

In this embodiment, the handling means 90 are in practice in the form of a handle 91 which is fixed to the external face 31b of the support plate 31 and which extends transversely. The displacement of the mobile guide members 30 is thus carried out simply by pulling or pushing longitudinally the operating handle 91 (FIG. 4) when the locking means 80 are deactivated.

Naturally, the invention also relates to any module 140 of a processing machine 100 for flat elements which comprises at least one conveying device 1 as described above. It relates, therefore, to any type of module capable of being integrated in a processing machine whether it refers to a simple conveying module or a more complex module as it is provided with a specific principal functionality in addition to its conveying function such as, in particular, a feeder, an alignment module, a quality control module, a module for embossing braille characters, a pre-scoring module, a gluing module, a folding module, a transfer module, a receiving module, etc. in the case, for example, of a processing machine of the folding-gluing type.

However, even more generally, the invention further relates to any processing machine 100 for flat elements which has at least one conveying device 1 as disclosed above. It goes without saying here that the concept of a processing machine has been shown to be very broad since it extends from a simple conveyor of flat objects to any machine which is more or less complex in which the conveying of flat objects is carried out, such as for example a folding-gluing machine.

The invention claimed is:

1. A conveying device for flat elements along a conveying path, comprising:
    an endless conveying member which is guided to travel over the entire length of the conveying path by a succession of substantially adjacent guide members, at least one mobile guide member being movably mounted at a distance from static fixedly mounted guide members, the mobile guide member being movable between a retracted position, in which the mobile guide member is placed in a direct continuity with the static guide members, and a deployed position, in which the mobile guide member is kept at a distance from the static guide members;
    complementary guide members which are movably mounted to be displaced between a reserve position, in which the complementary guide members are placed at a distance from the static guide members and from the mobile guide member when the mobile guide member is in a retracted position, and a service position in which the complementary guide members are interposed continuously between the static guide members and from the mobile guide member when the mobile guide member is in the deployed position;
    coupling means configured for causing the displacement of the complementary guide members between the reserve position and the service position, when the mobile guide member is displaced between the retracted position and the deployed position, and
    the coupling means comprising a drive element which is fixed to the complementary guide members and which cooperate simultaneously by sliding,
        on the one hand, with a static drive guide comprised of a guide element fixed to the static guide members, the static drive guide being configured to define an oblique guide trajectory which moves toward the conveying path relative to the direction of displacement of the flat elements, and,
        on the other hand, a mobile drive guide comprising a guide element fixed to the mobile guide member, the mobile drive guide being configured to define an oblique guide trajectory which moves away from the conveying path relative to the direction of displacement of the flat elements.

2. The device as claimed in claim 1, further comprising: between the retracted position and the deployed position, the mobile guide member is fixedly mounted to be mobile in longitudinal translation along a trajectory which is substantially parallel to the conveying path of the flat elements.

3. The device as claimed in claim 2, further comprising: first guide means configured to guide displacement of the mobile guide member between the retracted position and the deployed position.

4. The device as claimed in claim 3, further comprising between their reserve position and their service position, the different complementary guide members are fixedly mounted to be mobile in longitudinal translation along a trajectory which is substantially oblique relative to the conveying path of the flat elements.

5. The device as claimed in claim 4, further comprising: second guide means configured to guide displacement of the complementary guide members between the reserve position and the service position.

6. The device as claimed in claim 1, further comprising one of the drive guides defines a rectilinear guide trajectory, while the other drive guide defines a curved guide trajectory.

7. The device as claimed in claim 1, further comprising locking means configured for blocking mobility of the mobile guide member between the retracted position and the deployed position.

8. The device as claimed in claim 1, further comprising handling means fixed to the mobile guide member and configured to be activated manually to cause displacement of the mobile guide member between the retracted position and the deployed position.

9. A module for a processing machine for flat elements, comprising at least one conveying device as claimed in claim 1.

10. A processing machine for flat elements, comprising at least one conveying device as claimed in claim 1.

\* \* \* \* \*